(12) United States Patent
Suh et al.

(10) Patent No.: US 7,872,955 B2
(45) Date of Patent: *Jan. 18, 2011

(54) RECORDING MEDIUM, METHOD OF CONFIGURING CONTROL INFORMATION THEREOF, RECORDING AND/OR REPRODUCING METHOD USING THE SAME, AND APPARATUS THEREOF

(75) Inventors: Sang Woon Suh, Seoul (KR); Jin Yong Kim, Seongnam-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 11/445,197

(22) Filed: Jun. 2, 2006

(65) Prior Publication Data

US 2006/0221790 A1 Oct. 5, 2006

Related U.S. Application Data

(63) Continuation of application No. 10/883,667, filed on Jul. 6, 2004.

(30) Foreign Application Priority Data

| Jul. 7, 2003 | (KR) | 10-2003-0045825 |
| Aug. 14, 2003 | (KR) | 10-2003-0056540 |
| Sep. 4, 2003 | (KR) | 10-2003-0061785 |

(51) Int. Cl.
G11B 7/00 (2006.01)

(52) U.S. Cl. ............... 369/47.52; 369/59.11; 369/47.21; 369/59.25; 369/53.31

(58) Field of Classification Search ................. None
See application file for complete search history.

(56) References Cited

U.S. PATENT DOCUMENTS

| 5,361,173 A | 11/1994 | Ishii et al. |
| 5,485,469 A | 1/1996 | Suzuki |
| 5,502,702 A | 3/1996 | Nakajo |
| 5,590,096 A | 12/1996 | Ohtsuka et al. |
| 5,636,631 A | 6/1997 | Waitz et al. |
| 5,764,621 A | 6/1998 | Choi |

(Continued)

FOREIGN PATENT DOCUMENTS

AU 2004254437 1/2005

(Continued)

OTHER PUBLICATIONS

Office Action issued May 7, 2007 in counterpart European Patent Application No. 04 748 388.8-2210.

(Continued)

Primary Examiner—Jorge L Ortiz Criado
(74) Attorney, Agent, or Firm—Harness, Dickey & Pierce, P.L.C.

(57) ABSTRACT

The present invention provides a method of recording control information in a recordable optical disc including at least one recording layer. In recording control information within a management area of an optical disc including at least one or more recording layers, the present invention includes providing the control information to each of the at least one or more recording layers per recording velocity, recording an information identifying a type of the corresponding control information within the control information, and recording a write strategy (WS) interworking with the type of the control information. In recording a write strategy (WS) within disc information, CLV and CAV are separately recorded, whereby it is able to efficiently cope with the record/playback of the optical disc.

31 Claims, 12 Drawing Sheets

U.S. PATENT DOCUMENTS

| | | |
|---|---|---|
| 5,793,546 A | 8/1998 | Tanaka |
| 5,835,462 A | 11/1998 | Mimnagh |
| 5,892,633 A | 4/1999 | Ayres et al. |
| 5,914,920 A | 6/1999 | Yokogawa |
| 5,959,962 A | 9/1999 | Matsumaru et al. |
| 5,978,351 A | 11/1999 | Spruit et al. |
| 6,335,070 B1 | 1/2002 | Tomita |
| 6,415,435 B1 | 7/2002 | McIntyre |
| 6,480,450 B1 | 11/2002 | Fujii et al. |
| 6,487,713 B1 | 11/2002 | Cohen et al. |
| 6,504,806 B1 | 1/2003 | Nakajo |
| 6,535,470 B1 | 3/2003 | Wu |
| 6,580,671 B1 | 6/2003 | Otomo et al. |
| 6,643,233 B1 | 11/2003 | Yen et al. |
| 6,684,328 B2 | 1/2004 | Matsuura |
| 6,711,107 B2 | 3/2004 | Chao et al. |
| 6,741,529 B1 | 5/2004 | Getreuer |
| 6,868,054 B1 | 3/2005 | Ko |
| 6,891,786 B2 | 5/2005 | Sato |
| 6,894,961 B1 | 5/2005 | Osakabe |
| 6,996,047 B2 | 2/2006 | Nagano |
| 6,999,393 B2 | 2/2006 | Yamada |
| 7,012,878 B2 | 3/2006 | Shinotsuka et al. |
| 7,075,871 B2 | 7/2006 | Kato et al. |
| 7,088,667 B2 | 8/2006 | Kobayashi |
| 7,161,881 B2 | 1/2007 | Pereira |
| 7,170,841 B2 | 1/2007 | Shoji et al. |
| 7,193,948 B2 * | 3/2007 | Furukawa et al. ........ 369/59.11 |
| 7,212,480 B2 | 5/2007 | Shoji et al. |
| 7,218,585 B2 | 5/2007 | Tanii et al. |
| 7,230,907 B2 | 6/2007 | Shoji et al. |
| 7,286,455 B2 | 10/2007 | Shoji et al. |
| 7,304,938 B2 | 12/2007 | Hwang et al. |
| 7,345,970 B2 | 3/2008 | Kim et al. |
| 7,369,475 B2 | 5/2008 | Nagai |
| 7,376,072 B2 | 5/2008 | Shoji et al. |
| 7,400,571 B2 | 7/2008 | Shoji et al. |
| 7,414,936 B2 | 8/2008 | Tasaka et al. |
| 7,423,951 B2 | 9/2008 | Shoji et al. |
| 7,471,879 B2 | 12/2008 | Fuchigami et al. |
| 2001/0044935 A1 | 11/2001 | Kitayama |
| 2001/0053114 A1 | 12/2001 | Miyake et al. |
| 2001/0053115 A1 | 12/2001 | Nobukuni et al. |
| 2002/0021656 A1 | 2/2002 | Tsukagoshi et al. |
| 2002/0044509 A1 | 4/2002 | Nakajima |
| 2002/0048241 A1 | 4/2002 | Kumagai et al. |
| 2002/0048646 A1 | 4/2002 | Tomura et al. |
| 2002/0085470 A1 | 7/2002 | Yokoi |
| 2002/0089914 A1 | 7/2002 | Nakajo |
| 2002/0114234 A1 | 8/2002 | Chao et al. |
| 2002/0126604 A1 | 9/2002 | Powelson et al. |
| 2002/0126611 A1 | 9/2002 | Chang |
| 2002/0159352 A1 | 10/2002 | Yamada |
| 2002/0167879 A1 | 11/2002 | Ohno |
| 2002/0167880 A1 | 11/2002 | Ando et al. |
| 2003/0021201 A1 | 1/2003 | Kabayashi |
| 2003/0021202 A1 | 1/2003 | Usui et al. |
| 2003/0039187 A1 | 2/2003 | Geutskens |
| 2003/0048241 A1 | 3/2003 | Shin et al. |
| 2003/0058771 A1 | 3/2003 | Furukawa et al. |
| 2003/0072251 A1 | 4/2003 | Kondo |
| 2003/0076775 A1 | 4/2003 | Sato et al. |
| 2003/0086345 A1 | 5/2003 | Ueki et al. |
| 2003/0086346 A1 | 5/2003 | Fukumoto |
| 2003/0137915 A1 | 7/2003 | Shoji et al. |
| 2003/0151994 A1 | 8/2003 | Tasaka et al. |
| 2003/0159135 A1 | 8/2003 | Hiller et al. |
| 2003/0185130 A1 | 10/2003 | Kamperman et al. |
| 2003/0223339 A1 | 12/2003 | Taniguchi et al. |
| 2003/0231567 A1 | 12/2003 | Moritomo |
| 2003/0237024 A1 | 12/2003 | Ogawa et al. |
| 2004/0001407 A1 | 1/2004 | Kim et al. |
| 2004/0004921 A1 | 1/2004 | Lee et al. |
| 2004/0010745 A1 | 1/2004 | Lee et al. |
| 2004/0013074 A1 | 1/2004 | Lee et al. |
| 2004/0022150 A1 | 2/2004 | Lee et al. |
| 2004/0030962 A1 | 2/2004 | Swaine et al. |
| 2004/0062160 A1 | 4/2004 | Park et al. |
| 2004/0076096 A1 | 4/2004 | Hwang et al. |
| 2004/0090888 A1 | 5/2004 | Park et al. |
| 2004/0114474 A1 | 6/2004 | Park et al. |
| 2004/0125717 A1 | 7/2004 | Ko et al. |
| 2004/0145980 A1 | 7/2004 | Park et al. |
| 2004/0184395 A1 | 9/2004 | Lee et al. |
| 2004/0223434 A1 | 11/2004 | Nishimura et al. |
| 2005/0019023 A1 | 1/2005 | Ko |
| 2005/0025005 A1 | 2/2005 | Hwang et al. |
| 2005/0030853 A1 | 2/2005 | Lee et al. |
| 2005/0030870 A1 | 2/2005 | Rijpers et al. |
| 2005/0036425 A1 | 2/2005 | Suh et al. |
| 2005/0038957 A1 | 2/2005 | Suh |
| 2006/0233059 A1 | 10/2006 | Suh et al. |
| 2007/0088954 A1 | 4/2007 | Furukawa et al. |
| 2007/0115765 A1 | 5/2007 | Kobayashi |
| 2008/0043588 A1 | 2/2008 | Suh et al. |

FOREIGN PATENT DOCUMENTS

| | | |
|---|---|---|
| CN | 1151071 | 6/1997 |
| CN | 1182497 | 5/1998 |
| CN | 1229503 | 9/1999 |
| CN | 1352793 | 6/2002 |
| CN | 1400588 | 3/2003 |
| CN | 1416115 | 5/2003 |
| CN | 1656544 | 8/2005 |
| EP | 0 265 984 | 5/1988 |
| EP | 0 552 903 A2 | 7/1993 |
| EP | 0 968 769 A2 | 1/2000 |
| EP | 1 128 383 A2 | 8/2001 |
| EP | 1 172 810 A2 | 1/2002 |
| EP | 1 174 875 | 1/2002 |
| EP | 1 244 097 A2 | 9/2002 |
| EP | 1 298 659 A1 | 4/2003 |
| EP | 1 308 942 A2 | 5/2003 |
| EP | 1 329 888 A1 | 7/2003 |
| EP | 1 331 631 A1 | 7/2003 |
| EP | 1 361 571 A1 | 11/2003 |
| EP | 1 369 850 A1 | 12/2003 |
| EP | 1 471 506 A1 | 10/2004 |
| EP | 1 522 994 A1 | 4/2005 |
| EP | 1 605 445 A2 | 12/2005 |
| EP | 1642278 | 4/2006 |
| JP | 62-241174 | 10/1987 |
| JP | 64-055742 | 3/1989 |
| JP | 3-157816 | 7/1991 |
| JP | 6-309802 | 11/1994 |
| JP | 8069681 | 3/1996 |
| JP | 8249662 | 9/1996 |
| JP | 8-287474 | 11/1996 |
| JP | 9-128899 | 5/1997 |
| JP | 9-134525 | 5/1997 |
| JP | 9-147487 | 6/1997 |
| JP | 09-160761 | 6/1997 |
| JP | 9282661 | 10/1997 |
| JP | 10-172241 | 6/1998 |
| JP | 11-085413 | 3/1999 |
| JP | 11-513521 | 11/1999 |
| JP | 2000-113458 | 4/2000 |
| JP | 2000-163746 | 6/2000 |
| JP | 2000-163883 | 6/2000 |
| JP | 2001-052337 | 2/2001 |
| JP | 2001-202630 | 7/2001 |
| JP | 2001-297447 | 10/2001 |
| JP | 2001-312861 | 11/2001 |

| | | |
|---|---|---|
| JP | 2002-050040 | 2/2002 |
| JP | 2002-050053 | 2/2002 |
| JP | 2002-074855 | 3/2002 |
| JP | 2002-124038 | 4/2002 |
| JP | 2002-230764 | 8/2002 |
| JP | 2002-245624 | 8/2002 |
| JP | 2002-245625 | 8/2002 |
| JP | 2002-352430 | 12/2002 |
| JP | 2002-352435 | 12/2002 |
| JP | 2002-358641 | 12/2002 |
| JP | 2003-006860 | 1/2003 |
| JP | 2003-045036 | 2/2003 |
| JP | 2003-178448 | 6/2003 |
| JP | 2003-203341 | 7/2003 |
| JP | 2003-203350 | 7/2003 |
| JP | 2003-257026 | 9/2003 |
| JP | 2004-005772 | 1/2004 |
| JP | 2006-507760 | 3/2006 |
| KR | 2001-0011557 | 2/2001 |
| KR | 2001-0075535 | 8/2001 |
| KR | 2003-0056084 | 12/2001 |
| KR | 10-2005-0003343 | 1/2005 |
| RU | 2 092 910 | 10/1997 |
| RU | 2181217 | 4/2002 |
| RU | 2181509 | 4/2002 |
| TW | 481785 | 4/2002 |
| TW | 509924 | 11/2002 |
| TW | 509935 | 11/2002 |
| TW | 518580 | 1/2003 |
| TW | 541522 | 7/2003 |
| TW | 543032 | 7/2003 |
| TW | 546635 | 8/2003 |
| TW | 238394 | 8/2005 |
| WO | WO 97/13244 | 4/1997 |
| WO | WO 00/79525 A1 | 12/2000 |
| WO | WO 01/06500 A2 | 1/2001 |
| WO | WO 02/17308 A1 | 2/2002 |
| WO | WO 02/29791 A1 | 4/2002 |
| WO | WO 02/065462 A1 | 8/2002 |
| WO | WO 02/086887 A1 | 10/2002 |
| WO | WO 02/086888 A2 | 10/2002 |
| WO | WO 02/089123 A1 | 11/2002 |
| WO | WO 03/010519 A1 | 2/2003 |
| WO | WO 03/025935 A1 | 3/2003 |
| WO | WO 03/030153 A2 | 4/2003 |
| WO | WO 03/046896 | 6/2003 |
| WO | WO 03/067581 A1 | 8/2003 |
| WO | WO 03/075265 A2 | 9/2003 |
| WO | WO 03/105139 A1 | 12/2003 |
| WO | WO 2004/013845 A1 | 2/2004 |
| WO | WO 2004/015707 A1 | 2/2004 |
| WO | WO 2004/072966 A1 | 8/2004 |
| WO | WO 2005/001819 A1 | 1/2005 |

OTHER PUBLICATIONS

Search Report issued May 4, 2007 in counterpart European Patent Application No. 06012044.1-2210.
Search Report issued May 8, 2007 in counterpart European Patent Application No. 06012045.8-2210.
International Search Report issued Sep. 16, 2004 in corresponding International Patent Application No. PCT/KR2004/001654.
Notice of References in the Office Action dated Sep. 6, 2006 in U.S. Appl. No. 10/883,667.
Office Action issued Oct. 26, 2007 by the Chinese Patent Office in counterpart Chinese Patent Application No. 200610084094.0.
Search Report issued Oct. 22, 2007 by the European Patent Office in counterpart European Patent Application No. 07016686.3-2210 (cited references previously submitted in the IDS filed Jan. 22, 2008).
Office Action issued Oct. 5, 2007 by the Japanese Patent Office in counterpart Japanese Patent Application No. 2006-523133.
Office Action issued Jan. 29, 2008 by the Indian Patent Office in counterpart Indian Patent Application No. 438/KOLNP/2006.
Office Action issued Jan. 25, 2008 by the Japanese Patent Office in counterpart Japanese Patent Application No. 2006-523136.
Search Report issued Apr. 15, 2008 by the European Patent Office in counterpart European Patent Application No. 07007644.3-2210.
Office Action issued Jun. 12, 2008 by the U.S. Patent and Trademark Office in counterpart U.S. Appl. No. 11/437,624.
Office Action issued Jun. 23, 2008 by the Russian Patent Office in counterpart Russian Patent Application No. 2004122413/28(024371).
Japanese Office Action corresponding to Japanese Application No. 2006-187883 dated Dec. 26, 2008.
Japanese Office Action corresponding to Japanese Application No. 2006-180280 dated Jan. 6, 2009.
Office Action for counterpart U.S. Appl. No. 11/907,658 dated Feb. 25, 2009.
Extended Search Report issued Mar. 27, 2009 by the European Patent Office in counterpart European Patent Application No. EP 07017410.7.
"80 mm (1,23 Gbytes per side) and 120 mm (3,95 Gbytes per side) DVD-Recordable Disk (DVD-R)," ECMA Standardizing Information and Communication Systems, Standard ECMA-279, Dec. 1998.
Extended Search Report issued Mar. 11, 2009 by the European Patent Office in counterpart European Patent Application No. 07007648.4.
Extended Search Report issued Mar. 4, 2009 by the European Patent Office in counterpart European Patent Application No. 05771159.0.
International Search Report issued Dec. 19, 2005 in counterpart International Patent Application No. PCT/KR2005/002518.
Office Action issued Mar. 17, 2009 by the Japanese Patent Office in counterpart Japanese Patent Application No. 2006-523136.
Notice of Allowance issued Apr. 16, 2009 by the Russian Patent Office in counterpart Russian Patent Application No. 2006107926/28 (with English language translation).
Office Action issued Jun. 26, 2009 by the USPTO in counterpart U.S. Appl. No. 11/907,661.
Notice of Allowance issued Jun. 8, 2009 by the USPTO in counterpart U.S. Appl. No. 10/880,663.
Office Action issued Mar. 5, 2009 by the USPTO in counterpart U.S. Appl. No. 12/068,919.
Notice of Allowance issued May 14, 2009 for counterpart Russian patent application No. 2005111867/28.
Office Action issued Sep. 1, 2009 by the Japanese Patent Office in counterpart Japanese Patent Application No. 2007-081296.
Decision on Grant issued Aug. 24, 2009 by the Russian Patent Office in counterpart Russian Patent Application No. 2007135326/28 (with English language translation).
Decision on Grant issued Aug. 12, 2009 by the Russian Patent Office in counterpart Russian Patent Application No. 2004122401/28 (English language translation).
Search Report issued Jul. 2, 2008 by the European Patent Office in counterpart European Patent Application No. 07120273.3-2210.
Korean Office Action dated Apr. 1, 2010 for corresponding Korean Application No. 10-2003-0045824.
Japanese Office Action dated Apr. 13, 2010 for corresponding Japanese Application No. 2007-163713.
Taiwanese Office Action dated Apr. 6, 2010 with English translation for corresponding Taiwanese Application No. 95140641.
Chinese Patent Gazette dated Apr. 14, 2010 for Application No. 2006-10100731.9.
Malaysian Office Action dated May 31, 2010 with English translation for corresponding Malaysian Application No. PI 20042671.
Japanese Office Action dated Jun. 11, 2010 for Japanese Application No. 2006-187882.
Korean Notice of Allowance for corresponding Application No. 10-2003-0056540 dated Jun. 30, 2010.
Taiwanese Office Action dated Nov. 27, 2009.
Korean Notice of Allowance dated Sep. 15, 2010 issued in corresponding Korean application No. 10-2003-0065628.
Chinese Patent Gazette dated Aug. 4, 2010 issued in corresponding Chinese application No. 200480027086.1.

* cited by examiner

FIG. 6

| Byte number | contents | Number of bytes |
|---|---|---|
| 0 | Disc Information identifier = "DI" | 2 |
| 5 | DI frame sequence number in DI block | 1 |
| N | DI Type | 1 |
| ... | ... | |
| L to 111 | Write strategy parameters (dependent on DI Type) | |

Disc Information (112 bytes)

0000 0000b : CLV DI (WS for 1 velocity)
0000 0001b : CAV DI (WS for 2 velocities)
0000 0010b : CAV DI (WS for 2 velocities)
0000 0011b : CAV DI (WS for 3 velocities)

FIG. 11

| Byte number | contents | Number of bytes |
|---|---|---|
| 0 | Disc Information identifier = "DI" | 2 |
| 5 | DI frame sequence number in DI block | 1 |
| N | DI Type =CLV (0000 0000b) | 1 |
| P | Write Strategy (WS) Type =WS-1 (0000 0001b) | 1 |
| ... | ... | ... |
| L to 111 | Maximum dc read power | |
| | Maximum HF modulated read power | |
| | Write power settings at Recording Velocity | |
| | Tmp write pulse duration | |
| | Ttop first write pulse duration | |
| | dTtop first write pulse start time at Recording Velocity | |
| | Te erase multi-pulse duration | |
| | dTe first erase pulse start time at Recording Velocity | |

00h (Layer0, 1x DI)

Write Strategy Parameters (DI Type = CLV & WS Type = WS-1)

RECORDING MEDIUM, METHOD OF CONFIGURING CONTROL INFORMATION THEREOF, RECORDING AND/OR REPRODUCING METHOD USING THE SAME, AND APPARATUS THEREOF

This application is a continuation of U.S. patent application Ser. No. 10/883,667 filed on Jul. 6, 2004, the entire contents of which are hereby incorporated by reference. This application also claims the benefit of Korean Applications No. 10-2003-0045825 filed on Jul. 7, 2003; No. 10-2003-0056540 filed on Aug. 14, 2003; and No. 10-2003-0061785 filed on Sep. 4, 2003, the entire contents of which are hereby incorporated by reference.

BACKGROUND OF THE INVENTION

1. Field of the Invention

The present invention relates to a method of recording control information on a recording medium, such as a recordable optical disc, and a method of recording data on a recording medium using the control information.

2. Discussion of the Related Art

A high-density optical recording medium, known as HD-DVD, is widely used to record and store high-definition video data and high-quality audio data. The Blu-ray disc (hereinafter abbreviated BD) represents next-generation HD-DVD technology.

Technological specifications are now being established for the global standardization of the Blu-ray disc, including standards for a write-once Blu-ray disc (BD-WO). Meanwhile, a rewritable Blu-ray disc, known as 1× speed BD-RE and now under discussed should be compatible with BD-RE discs expected to have higher writing speed, i.e., 2× speed BD-RE and beyond. BD-WO specifications for high writing speed are also in progress. Efficient solutions for coping with the high writing speed of a high-density optical disc are urgently needed, and the specifications established should ensure mutual compatibility.

SUMMARY OF THE INVENTION

Accordingly, the present invention is directed to a method of recording control information in an optical disc that substantially obviates one or more problems due to limitations and disadvantages of the related art.

An object of the present invention is to provide a new method of recording control information as specified information coping with high writing speed, in which information indicating a kind of control information is recorded within the control information as well as a write strategy interworking with the recorded information.

Another object of the present invention is to define a new data structure configuring control information.

Another object of the present invention is to provide a specified method of recording control information coping with high writing speed in a specific area within a disc, by which reciprocal compatibility is provided between the same based discs.

A further object of the present invention is to provide a recording/reproducing method and apparatus thereof, by which real data is recorded/reproduced on/from an optical disc using the recorded control information.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of recording control information on a recording medium according to the present invention includes the steps of generating a control information associated with at least one or more recording layers and recording velocities, the control information including first information identifying a type of the corresponding control information, the information indicating whether the control information is used for CLV (constant linear velocity) or CAV (constant angular velocity), and a write strategy parameters associated with the type of the control information; and recording the control information on a specific area of the recording medium.

In another aspect of the present invention, A data structure of a control information recorded on a recording medium or to be recorded/reproduced on/from the recording medium, characterized in that the control information associated with a specific recording layer and/or a specific recording velocity and the control information comprises write strategy information dependent on a type information indicating whether the control information is associated with CAV or CLV.

In another aspect of the present invention, a recording medium includes at least one recording layer provided with a recordable area and a pre-recorded area, wherein a disc information is separately provided according to each recording velocity and/or each recording layer to the pre-recorded area and wherein an identification information identifying a type of the disc information therein and a write strategy information associated with the identification information therein are provided to the disc information.

In another aspect of the present invention, An optical disc includes at least one or more recording layers, wherein a control information is provided according to each recording layer and/or each recording velocity, wherein an identification information identifying a type of the control information and a write strategy parameters associated with the identification information are recorded within the control information.

In another aspect of the present invention, a method of recording data on a recording medium includes the steps of reading a plurality of control information separately recorded according to each recording velocity within a management area of the recording medium, checking an identification information identifying a control information type recorded within each control information, and performing a recording of data based on a write strategy information associated with a corresponding recording velocity from the identification information.

In another aspect of the present invention, a method of recording data on a recording medium includes the steps of identifying a specific control information based on an identification information identifying a type of control information, wherein the control information associated with specific recording velocity and/or specific recording layer to provide a reference information for recording or reading of data, the identification information identifying whether the control information is used for CLV or CAV, and recording data using write strategy parameters included in the control information to be used for CLV or CAV as a result of identifying step.

In another aspect of the present invention, an apparatus for recording data on a recording medium includes an optical pickup reading a plurality of control information associated with at least recording velocity within a management area of the recording medium; and a controller checking a control information type based on an identification information to identify whether the corresponding control information is used for CLV or CAV, reading a write strategy included in the corresponding control information as a result of the checking step, and performing the recording of data using the read write strategy.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 6 is a diagram of control information recorded according to another embodiment of the present invention;

FIG. 11 is a diagram of a write strategy within control information recorded according to the another further embodiment of the present invention in FIG. 10.

DETAILED DESCRIPTION OF THE INVENTION

Figure 1:
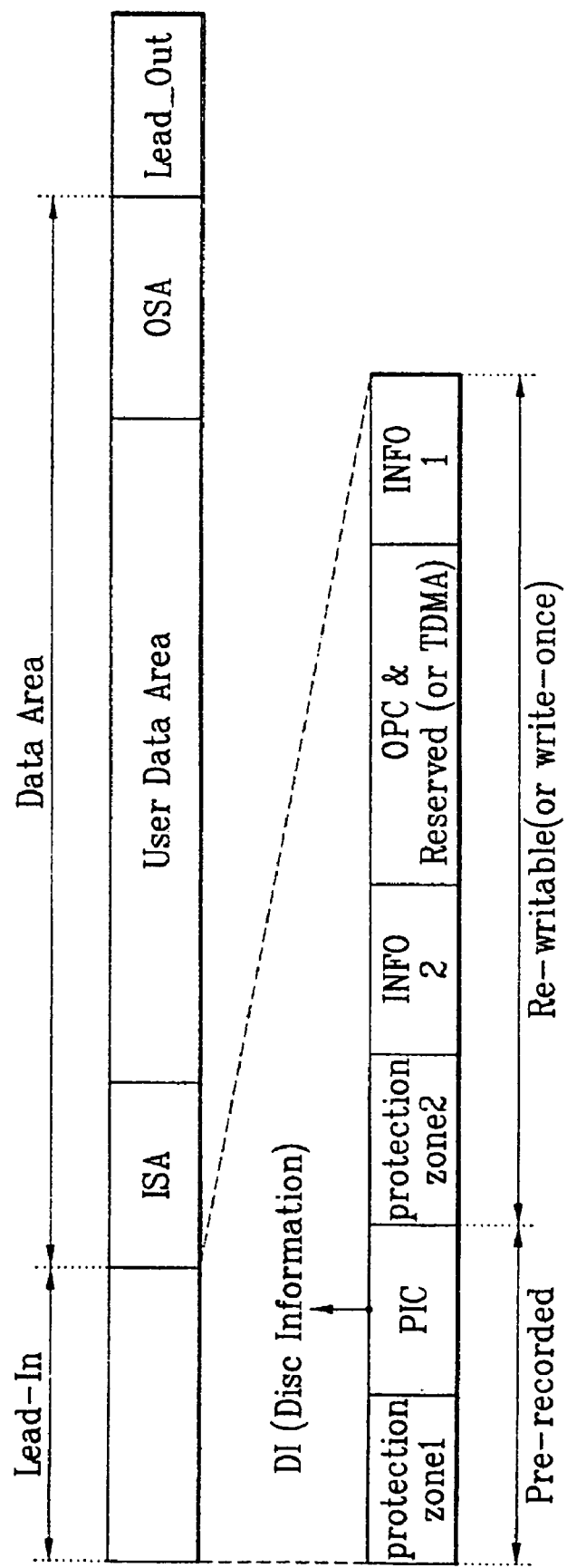
FIG. 1 is a diagram of a single-layer disc applicable to the present invention.

Reference will now be made in detail to the preferred embodiments of the present invention, examples of which are illustrated in the accompanying drawings. Wherever possible, the same reference numbers will be used throughout the drawings to refer to the same or like parts.

A Blu-ray disc is taken as an example of an optical disc according to the present invention. Yet, the concept of the present invention, characterized in an optical disc having its control information recorded thereon, is applicable to DVD-RAM, DVD-RW, DVD+RW, DVD-R, DVD+R and similar such discs.

Although the terminology used herein is well known for the most part, some terms have been chosen by the applicant, such that the present invention should be understood with the intended meanings of the terminology as used by the applicant.

For example, the 'control information' of a disc is recorded in a specified area, i.e., a recordable area of the disc or a prerecorded area, sometimes known as an embossed area, in which manufacturer data is recorded and where no further recording is possible, and includes information necessary for the playback of a recorded disc. Disc control information is called "disc information" or "DI" in relation to Blu-ray disc technology but is typically referred to as 'physical format information' for DVD-RAM, DVD-RW, DVD+RW, DVD-R, DVD+R discs. Hence, it should be apparent that the technical background of the present invention is equally applicable to physical format information.

Moreover, the disc information according to the present invention is recorded as an unspecified unit of information, which may be counted, for example, as a first or second information.

The present invention is characterized in that a write strategy (WS) is recorded by interworking with information that identifies a kind of disc information in recording the write strategy (WS) within disc information, one of a plurality of write strategy types is selectively recorded on manufacturing a disc, and a recording/reproducing apparatus (FIG. 12) performs recording/reproducing by referring to the write strategy (WS) recorded within the disc information. Preferentially, the meaning of 'write strategy (WS)' used in the description of the present invention is explained in detail as follows.

Considering the meaning of 'write strategy (WS)', a medium property of a recording layer is generally modified by applying a laser beam to the recording layer within an optical disc via a pickup ('11' in FIG. 12) to perform a recording thereof. Hence, it should be decided a strength (write power) of the laser beam, a time of applying the write power thereto, and the like. The above decided various kinds of record-associated information are named 'write strategy (WS)' in general and specific contents recorded within a specific 'write strategy (WS)' are named 'write strategy (WS) parameters'.

Write strategy (WS) information used in the present invention means the entire information associated with write strategy (WS). And, 'WS parameters' means items and specific numeric values configuring the WS and is a sort of WS information. Hence, the WS information has an inclusive concept including the above-described 'WS Type', 'WS flag' that will be explained later, and the like as well as the WS parameters.

And, the write strategy (WS) can be recorded in various ways. As a disc tends to be highly densified and to run at higher speed, a writing speed, i.e., disc RPM) as well as the medium property of the recording layer is considerably affected. Hence, a more accurate system is requested. And, the various write strategies (WS) are explained as follows for example.

First of all, there is a system having a recording pulse smaller by 1 than a recording mark size (n) formed on a recording layer medium, which may be called '(n−1) WS'. Secondly, there is a system having a recording pulse having a size amounting to a half of the recording mark size (n), which may be called 'n/2 WS'. Besides, new write strategies (WS) keep being developed. Regarding the different types of write strategies (WS), when there exist the various systems of the write strategy (WS) as parameters applied to the write strategies (WS) differ from each other, a disc manufacturer selects a specific WS to test write power according to write strategy parameters and then records a result of the test in 'WS parameters' field in a specific area within the disc information.

Moreover, as a method of recording data on a disc, there are a constant linear velocity (hereinafter abbreviated CLV) method and a constant angular velocity (hereinafter abbreviated CAV) method. The CLV method applies the same linear velocity to inner and outer circumferential areas of a disc to perform a recording at one recording velocity. The CAV method applies the same RPM to inner and outer circumferences of a disc, whereby linear speed in the outer circumference of the disc having a relatively smaller rotational radius of the disc increases faster than that in the inner circumference of disc having a relatively greater rotational radius. When the radiuses of the inner and outer circumferences are compared to each other, there exists about 2.4 times difference between recording velocities of the inner and outer circumferences of the disc.

Hence, in adopting the CAV system, a recording is performed at about 2.4× speed on the outer circumference and at 1× speed on the inner circumference. For example, the recording is performed on the inner circumference at 4× speed, whereas performed on the outer circumference at about 9.6× speed. Since there exists a big difference between the recording velocities of the inner and outer circumferences of the disc, it is necessary to select an optimal recording velocity and write strategy (WS) to be applied to each location of the disc to perform a recording thereon. Hence, the CAV method needs definitions for about three kinds of linear velocities (writing speed) such as 1× linear velocity, 1.7× linear velocity, and 2.4× linear velocity, which can be called 'one type recording velocity group'. And, a write strategy (WS) for each of the defined recording velocities should be recorded within disc information.

Figure 2:
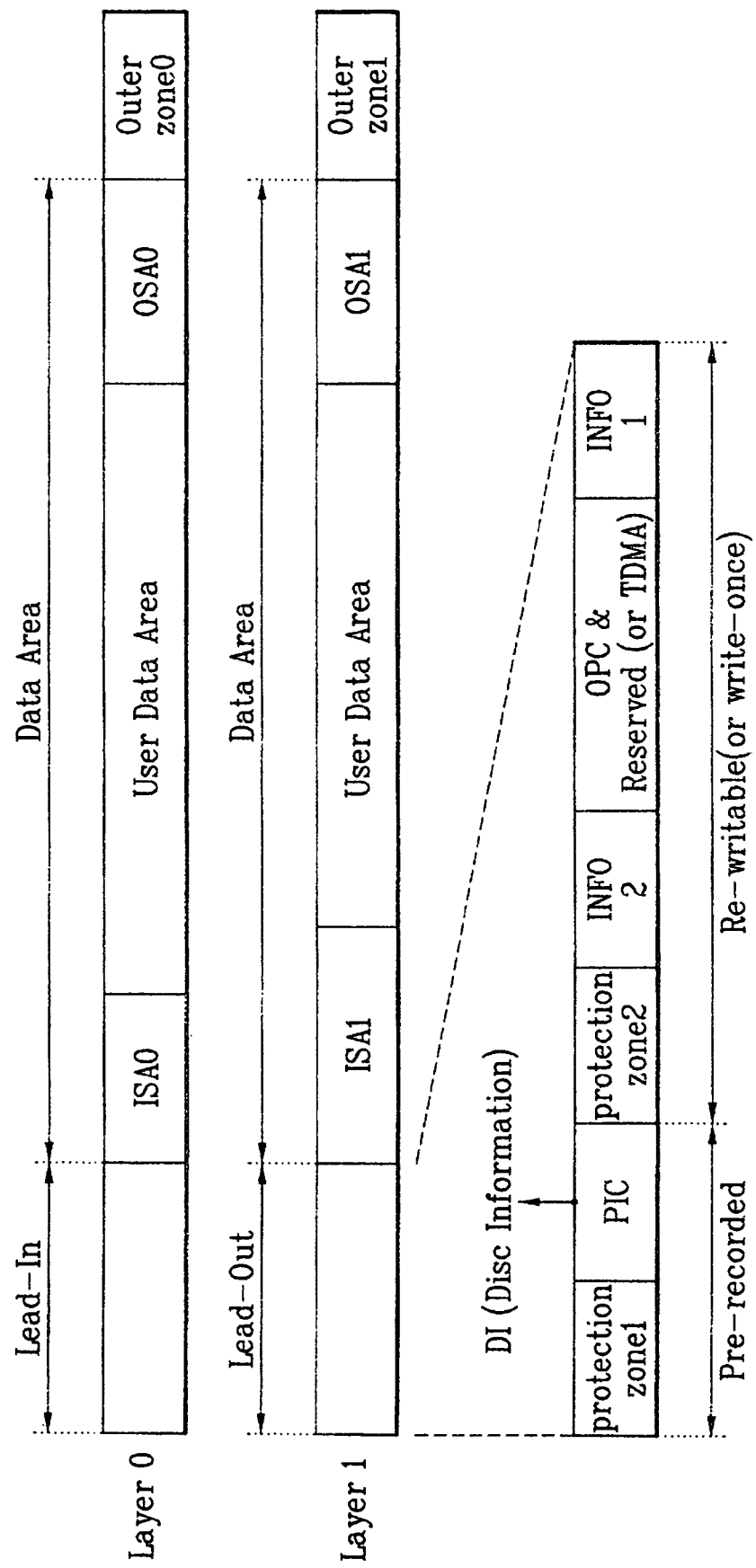
FIG. 2 is a diagram of a dual-layer disc applicable to the present invention.

FIG. 1 and FIG. 2 are structural diagrams of optical discs according to the present invention, in which a recordable optical disc is enough to be the optical disc applicable to the present invention. Moreover, the recordable disc can be any one of a rewritable optical disc, a write-once optical disc, and the like.

FIG. 1 is a structural diagram of a single-layer disc having one recording layer according to the present invention.

Referring to FIG. 1, a lead-in area is provided as a management area on an inner circumference area of an optical disc, whereas a lead-out area is provided as a management area on an outer circumference area of the optical disc. Specifically, a prerecorded area and a rewritable or write-once area are separated from each other within the inner circumference area of the disc.

The prerecorded area is an area (called 'embossed area') where data was already written in manufacturing the disc, whereby a user or system is unable to perform data writing on the prerecorded area at all. In BD-RE/WO, the prerecorded area is named PIC (permanent information and control data) area. And, the above-described disc information (hereinafter called 'DI') as information required for disc recording is recorded in the PIC area.

In a data area, provided are a user data area where user's real data is recorded and spare areas ISA and OSA to replace a generated defect area. Specifically, TDMA (temporary defect management area) for recording information of defect and general managements is provided to such a write-once optical disc as BD-WO. In case of the re-writable BD (BD-RE), TDMA is unnecessary so that such an area is left as a reserved area.

The present invention intends to provide a method of efficiently recording disc information (DI) as control information required for record playback of a disc in the prerecorded or recordable area. It is apparent that a recording method in the prerecorded area is differently applied to each kind of discs. In case of BD-RE/WO, the PIC area as the prerecorded area is recorded by biphased high frequency modulated signals, the high frequency modulated signals in the corresponding area are played back according to a specific playback method, and information is acquired from the playback.

FIG. 2 is a diagram of a dual-layer disc having dual recording layers, in which a recording layer starting with a lead-in is named a first recording layer Layer0 and a recording layer ending with a lead-out is named a second recording layer Layer1.

In the dual-layer disc, the PIC area is provided to lead-in and lead-out areas of a disc inner circumference area, and disc information (DI) of the same contents is recorded in the PIC area.

Figure 3:
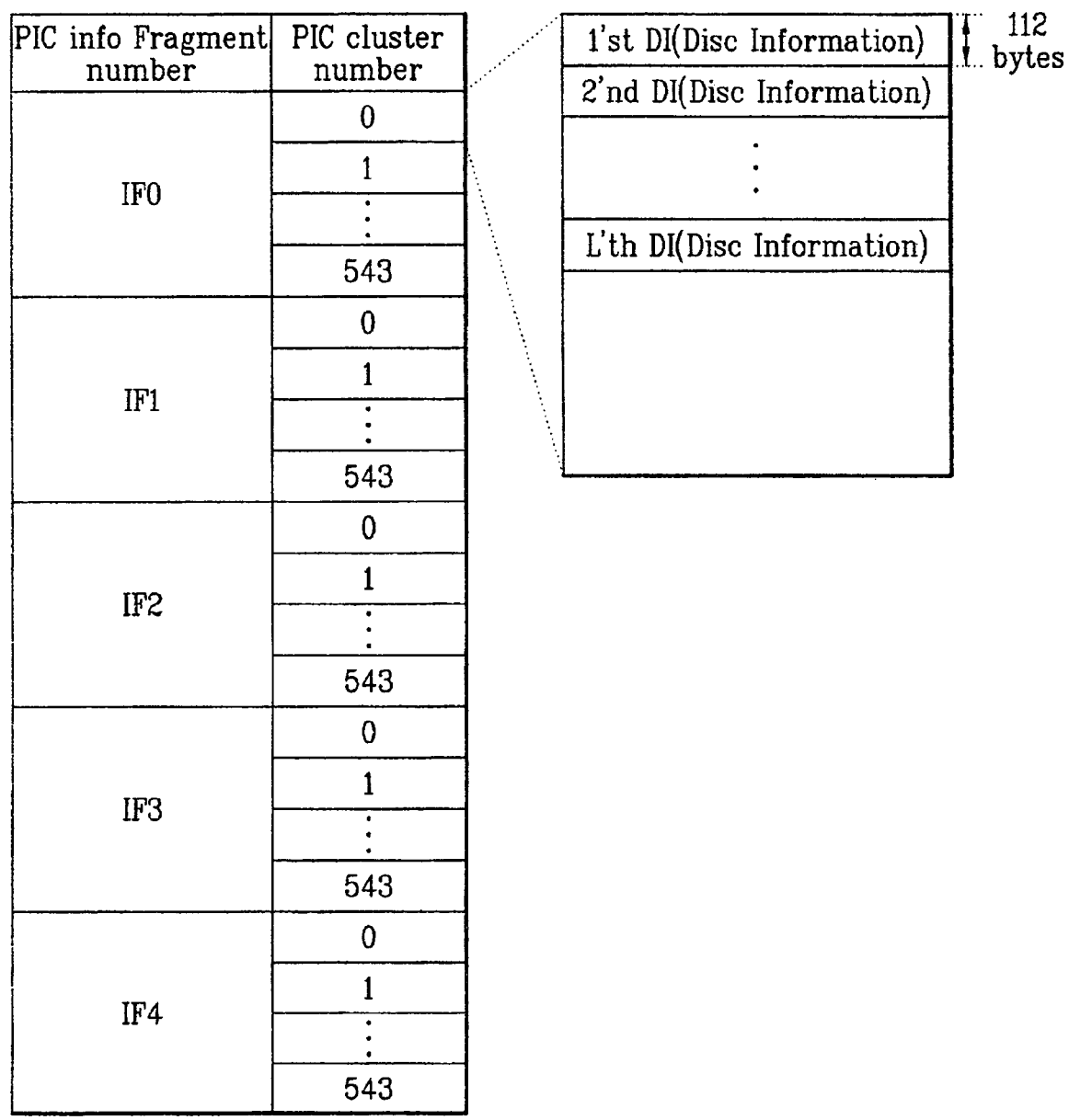
FIG. 3 is a diagram of a management area where control information of the present invention is recorded, in which a format of the disc information in a corresponding area is schematically shown.

FIG. 3 is a structural diagram of a PIC area in the disc shown in FIG. 1 or FIG. 2. As mentioned in the foregoing description, it means that information can be rearranged like the structure of the PIC area in FIG. 3 when the entire information within the high frequency modulated PIC area is acquired.

A method of configuring disc information (DI) in the PIC area is explained in detail as follows.

In BD-RE/WO, 'one cluster' represents a minimum record unit, five hundred forty-four clusters gather to construct one fragment as one upper record unit, and total five fragments gather to form the PIC area. Disc information is recorded in a front head cluster of a first fragment IFO. The disc information is plurally recorded per recording layer and writing speed permitted by the corresponding optical disc, and one disc information includes one hundred twelve bytes. Specifically, disc information constructed with 112-bytes is called disc information (DI) frame. Moreover, the same contents of the disc information are repeatedly recorded in each front head cluster of the rest of the fragments, thereby enabling to cope with loss of the disc information.

Information representing the corresponding recording layer, information representing writing speed, and write strategy information corresponding to the writing speed are recorded within each disc information. Hence, such information is utilized in the recording or reproducing of the corresponding optical disc, thereby enabling to provide optimal write power per recording layer and per writing speed.

Various embodiments for a method of recording a write strategy (WS) associated with a disc information type within disc information according to the present invention are explained in detail by referring to FIGS. 4 to 12 as follows.

Figure 4:
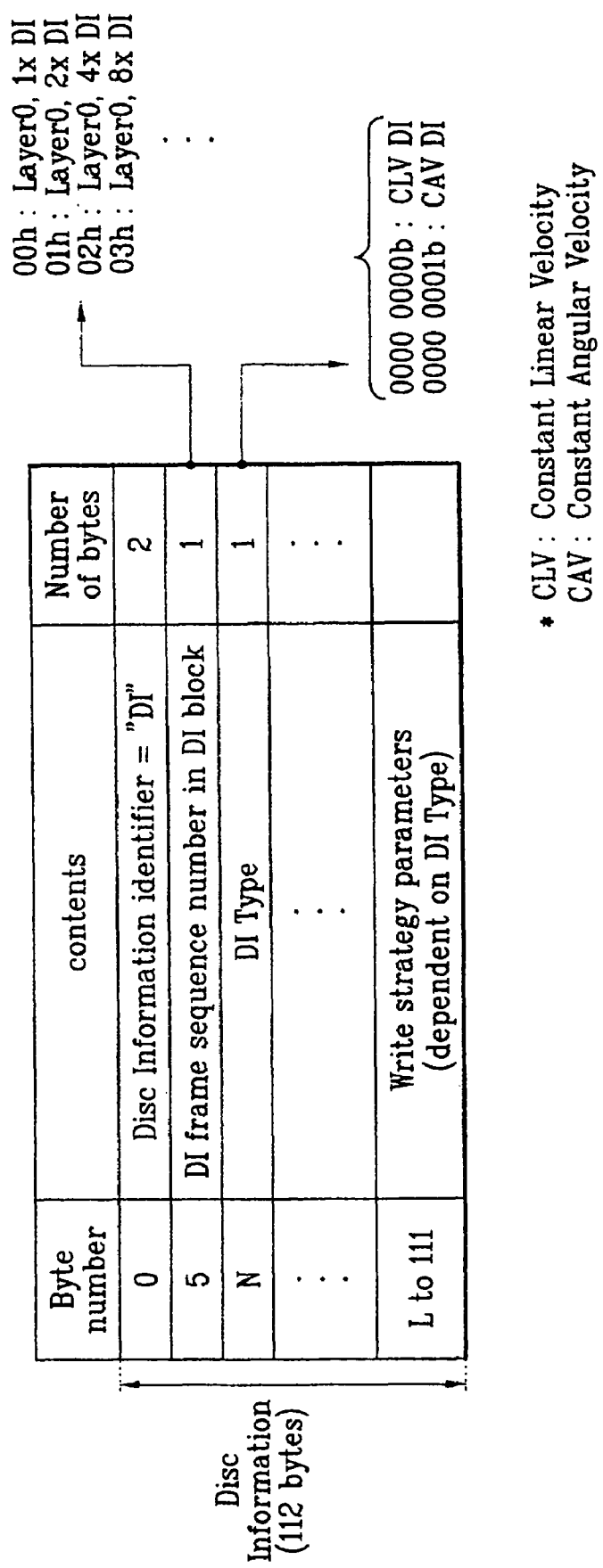
FIG. 4 is a diagram of control information recorded according to one embodiment of the present invention.

FIG. 4 is a diagram of recording disc information of an optical disc according to one embodiment of the present invention, in which a disc information structure is schematically shown.

Referring to FIG. 4, a plurality of disc information are recorded within a disc, a record sequence of each disc information is decided by a sequence number, and the record sequence is recorded by 1-byte. For instance, the corresponding information is recorded in $5^{th}$ byte within the disc information, which is named 'DI frame sequence number in DI block' field and is briefly indicated by '00h, 01h, 02h, 03h . . . '. Namely, if the information of the $5^{th}$ byte is '00h', it means $1^{st}$ disc information. And, if the information of the $5^{th}$ byte is '07h', it means $8^{th}$ disc information. Moreover, the meaning of 'DI frame sequence number in DI block' of the $5^{th}$ byte can be defined in a following manner. First of all, if the information of the $5^{th}$ byte is '00h', '00h' means $1^{st}$ disc information as well as disc information of 1× speed of a first recording layer Layer0. '01h' means $2^{nd}$ disc information as well as disc information of 2× speed of the first recording layer Layer0. '02h' means $_3$rd disc information as well as disc information of 4× speed of the first recording layer Layer0. And, '03h' means $4^{th}$ disc information as well as disc information of 8× speed of the first recording layer Layer0. It is a matter of course that the recording layer information and the writing speed information can be separately recorded in a reserved area within disc information.

And, identification information enabling to identify a type or kind of the disc information is recorded in a specific area of Nth byte, which is named 'DI Type' field, within the disc information. Moreover, a write strategy (WS) interoperating with the type of the corresponding disc information is recorded in another specific area, e.g., area named 'Write Strategy parameters' field as $L^{th}$~$111^{th}$ bytes, within the disc information.

Namely, it is identified whether the corresponding disc information is in 'CLV' mode or 'CAV' mode via 'DI Type' field, and the write strategy (WS) is recorded in a manner fitting the identified mode. For instance, if it is the CLV mode, a WS for one recording velocity is recorded only. If it is CAV mode, it is necessary to record a WS for one type recording velocity group (e.g., three kinds of linear velocities such as 1×, 1.7×, and 2.4×).

And, if the information identifying the disc information type is '0000 0000b' for example, it means to define 'CLV disc information (DI)'. If '0000 0001b', it means to define 'CAV disc information (DI).

Figure 5:
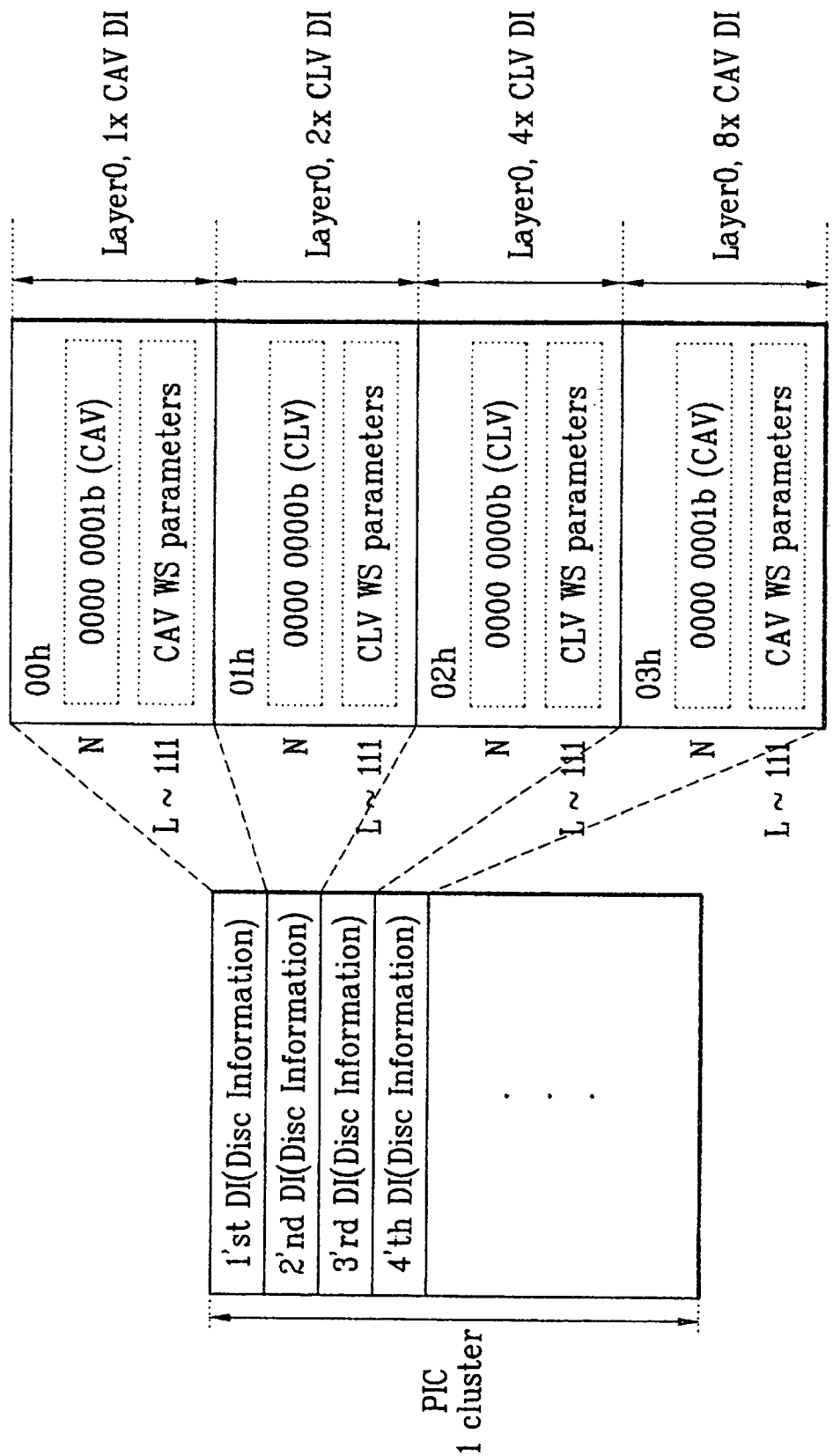
FIG. 5 is a diagram of a write strategy within control information recorded according to one embodiment of the present invention in FIG. 4.

FIG. 5 shows an exemplary method of recording disc information in case of recording identification information for identifying a disc information type in Nth byte within the disc information like FIG. 4, in which one recording layer Layer0 is shown for convenience of explanation. And, it is a matter of course that the method can be applied in the same manner even if there exist more recording layers.

The disc information of the present invention, as mentioned in the foregoing description, is information that a disc manufacturer records characteristics of a corresponding disc in a prerecorded area within the disc. A write strategy (WS) the disc has is defined so that a recording/reproducing apparatus (FIG. 12) can utilize it in the practical application of the recording/reproducing. Hence, in recording disc information, a disc manufacturer preferentially decides an applicable writing speed per recording layer and then records identification information indicating whether the decided writing speed corresponds to the CLV or CAV method in the $N^{th}$ byte. Hence, the write strategy (WS) interworking with the identification information is identified according to a CLV or CAV mode to be recorded in $L^{th}$~$111^{th}$ bytes.

For instance, disc information for 1× speed of $1^{st}$ recording layer is recorded in '00h' as a disc information sequence, a disc information type means a CAV mode, and a write strategy (WS) interworks with it so that a CAV WS is selected to be recorded. Disc information for 2× speed of $1^{st}$ recording layer is recorded in '01h', a disc information type means a CLV mode, and a write strategy (WS) interworks with it so that a CLV WS is selected to be recorded. Disc information for 4× speed of $1^{st}$ recording layer is recorded in '02h', a disc information type means a CLV mode, and a write strategy (WS) interworks with it so that a CLV WS is selected to be recorded. Disc information for 8× speed of $1^{st}$ recording layer is recorded in '03h', a disc information type means a CAV mode, and a write strategy (WS) interworks with it so that a CAV WS is selected to be recorded. In this case, the CLV or CAV WS means one write strategy (WS) selected by a disc manufacturer. In case of CLV, the write strategy will be applied to one kind writing speed. In case of CAV, the write strategy will be applied to a plurality of writing speeds for one type writing speed or recording velocity group.

FIG. 6 is a diagram of recording control information according to another embodiment of the present invention. Compared to the embodiment in FIG. 4, FIG. 6 shows that specific identification for CAV mode is subdivided to be applied to 'DI Type' field written in $N^{th}$ byte within disc information.

Namely, in case that corresponding disc information means CAV mode, this is subdivided to identify how many velocities are provided by a write strategy (WS). Hence, 'DI Type' field can be defined as follows. If 'DI Type' field recorded in Nth byte is '0000 0001b', it means CAV mode and a write strategy (WS) recorded in $L^{th}$~$111^{th}$ bytes is recorded to correspond to one kind of velocity only. If 'DI Type' field recorded in $N^{th}$ byte is '0000 0010b', it means CAV mode and a write strategy (WS) recorded in $L^{th}$~$111^{th}$ bytes is recorded to correspond to two kinds of velocities. If 'DI Type' field recorded in $N^{th}$ byte is '0000 00011b', it means CAV mode and a write strategy (WS) recorded in $L^{th}$~$111^{th}$ bytes is recorded to correspond to three kinds of velocities.

Generally, in case of CAV mode, the corresponding disc information has a write strategy relating to three kinds of velocities. Yet, the above-explained definition of 'DI Type' field enables a disc manufacturer to avoid having difficulty in coping with various write strategies. And, the above-explained definition of 'DI Type' field enables a manufacturer of a disc recording/reproducing apparatus to develop an inexpensive product coping with one write strategy (WS) only.

Figure 7:
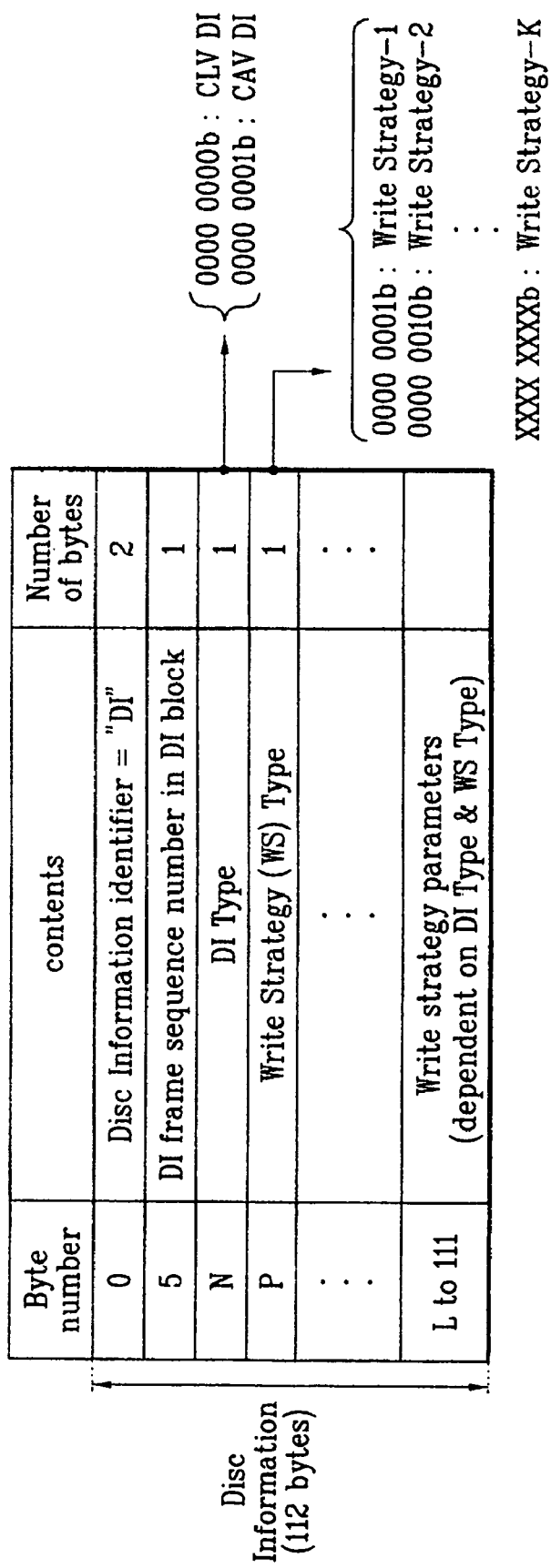
FIG. 7 is a diagram of control information recorded according to a further embodiment of the present invention.

FIG. 7 is a diagram of recording control information according to a further embodiment of the present invention, in which information for identifying a type of disc information is recorded within disc information like the embodiment in FIG. 4 together with another information enabling to identify a type of write strategy (WS) finally used.

Referring to FIG. 7, the information enabling to identify a write strategy (WS) type is to identify which one of a plurality of specified write strategies (WS) was selected to be used by a disc manufacturer, whereas the information for identifying a disc information type enables to identify whether corresponding disc information is in CLV mode or CAV mode. For instance, as mentioned in the foregoing description, various write strategy types, which can exist such as (n–1) WS, n/2 WS, etc., are defined as $1^{st}$ WS WS-1, $2^{nd}$ WS WS-2, . . . and $K^{th}$ WS WS-K. And, the information identifying the write strategy type (named 'WS Type') selected by a disc manufacturer is recorded within disc information.

This is explained by being compared to the embodiment in FIG. 4 as follows. First of all, 'Write Strategy (WS) Type' field is added to $P^{th}$ byte of the embodiment in FIG. 4 so that $L^{th}$~$111^{th}$ write strategy (WS) is recorded by interworking with a disc information type in $N^{th}$ byte and' a write strategy (WS) type in $P^{th}$ byte. Namely, it can be defined as follows. If '0000 0000b' is written in $P^{th}$ byte, it means $1^{st}$ WS WS-1. If '0000 0010b' is written in $P^{th}$ byte, it means $2^{nd}$ WS WS-2. And, if 'XXXX XXXXb' is written in $P^{th}$ byte, it means $K^{th}$ WS WS-K.

Figure 8:
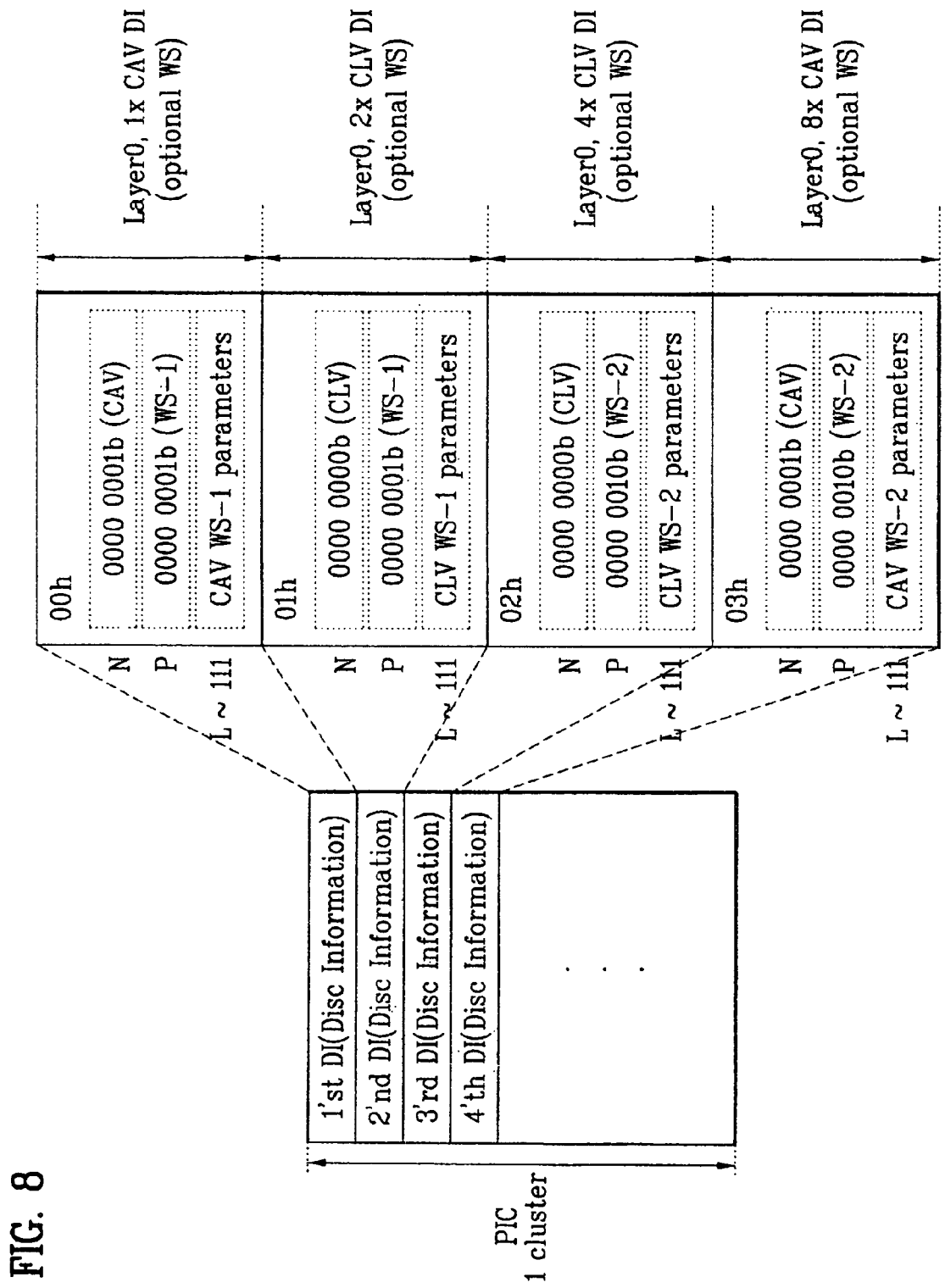
FIG. 8 is a diagram of a write strategy within control information recorded according to the further embodiment of the present invention in FIG. 7.
Figure 9:
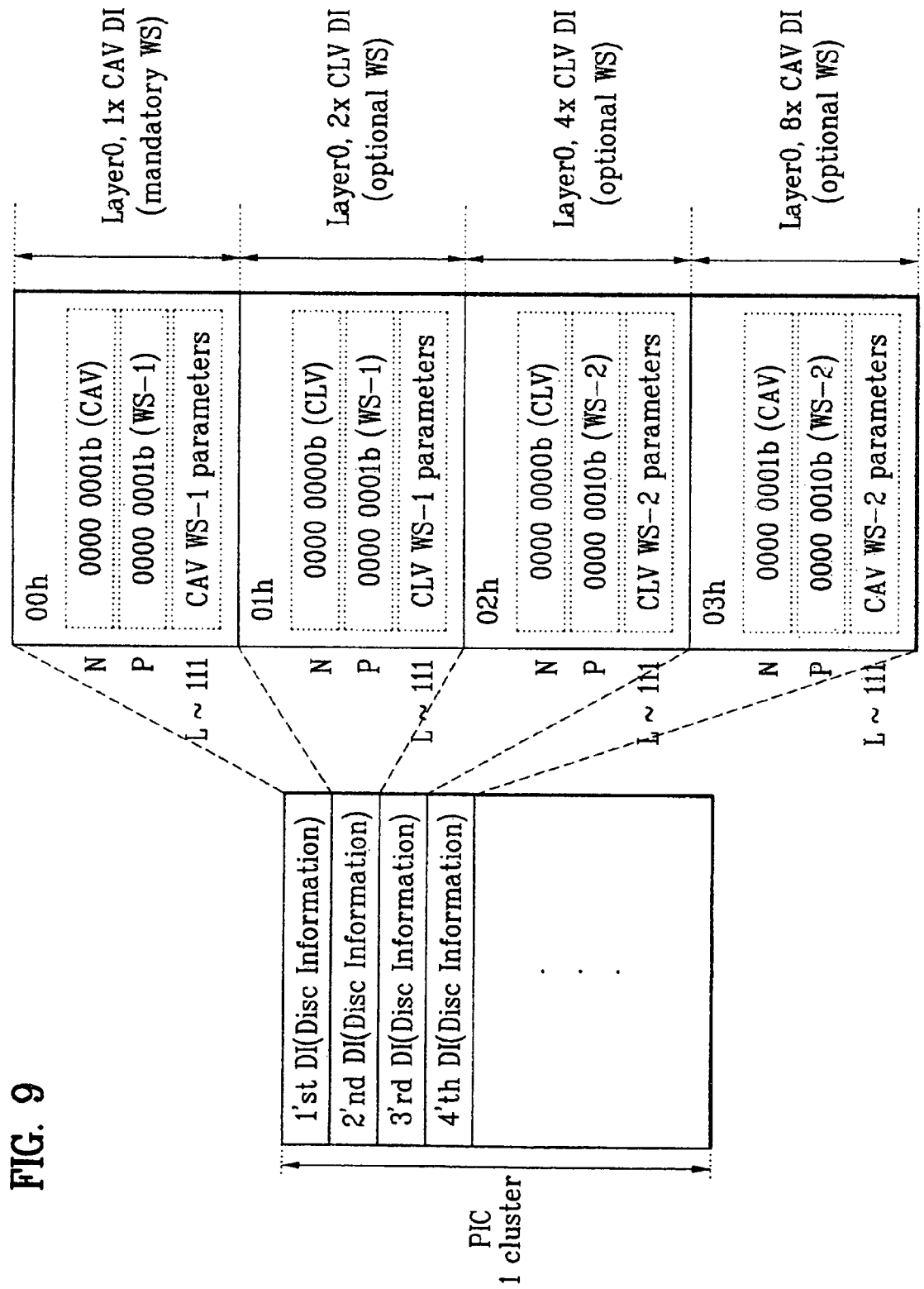
FIG. 9 is a diagram of another example of a write strategy within control information recorded according to the further embodiment of the present invention in FIG. 7.

FIG. 8 is a diagram of recording a write strategy within control information according to the further embodiment of the present invention in FIG. 7, and FIG. 9 is a diagram of another example of recording a write strategy within control information according to the further embodiment of the present invention in FIG. 7.

FIG. 8 shows that a disc manufacturer optionally records a specific write strategy (WS) for entire writing speeds in recording one of a plurality of write strategies (WS)

Referring to FIG. 8, $N^{th}$ byte of disc information indicates a disc information type, $P^{th}$ byte of disc information indicates a write strategy (WS) type, and parameters associated with one write strategy (WS) decided by interworking with the $N^{th}$ and $P^{th}$ bytes are recorded in $L^{th}$~$111^{th}$ bytes.

For instance, disc information for 1× speed of $1^{st}$ recording layer is recorded in '00h' as a disc information sequence, a disc information type means a CAV mode, a write strategy (WS) type means $1^{st}$ WS WS-1, and a write strategy (WS) interworks with them so that a CAV WS-1 is selected to be recorded. Disc information for 2× speed of $1^{st}$ recording layer is recorded in '01h', a disc information type means a CLV mode, a write strategy (WS) type means $1^{st}$ WS WS-1, and a write strategy (WS) interworks with them so that a CLV WS-1 is selected to be recorded. Disc information for 4× speed of $1^{st}$ recording layer is recorded in '02h', a disc information type means a CLV mode, a write strategy (WS) type means $2^{nd}$ WS WS-2, and a write strategy (WS) interworks with them so that a CLV WS-2 is selected to be recorded. Disc information for 8× speed of $1^{st}$ recording layer is recorded in '03h', a disc information type means a CAV mode, a write strategy (WS) type means $2^{nd}$ WS WS-2, and a write strategy (WS) interworks with them so that a CAV WS-2 is selected to be recorded.

FIG. 9 shows that one of a plurality of write strategies (WS) is recorded within disc information, in which a mandatory write strategy (WS) type is recorded for a specific specified writing speed (e.g., 1× speed) but a disc manufacturer optionally records a specific write strategy (WS) for the rest writing speeds.

Hence, the method in FIG. 9 differs from the method in FIG. 8 in that a write strategy (WS) type is decided in a mandatory manner by putting limitation on disc manufacturer's options for a specific writing speed (1× speed). This enables a manufacturer of a disc recording/reproducing apparatus (FIG. 12) to design to manufacture inexpensive products coping with one write strategy (WS) type only.

For instance, disc information for 1× speed of $1^{st}$ recording layer is recorded in '00h' as a disc information sequence, a disc information type means a CAV mode, a write strategy (WS) type means $1^{st}$ WS WS-1, and a write strategy (WS) interworks with them so that a CAV WS-1 is selected in a mandatory manner to be recorded. Disc information for 2× speed of 1st recording layer is recorded in '01h', a disc information type means a CLV mode, a write strategy (WS) type means $1^{st}$ WS WS-1, and a write strategy (WS) interworks with them so that a CLV WS-1 is selected to be recorded. Disc information for 4× speed of $1^{st}$ recording layer is recorded in '02h', a disc information type means a CLV mode, a write strategy (WS) type means $2^{nd}$ WS WS-2, and a write strategy (WS) interworks with them so that a CLV WS-2 is selected to be recorded. Disc information for 8× speed of $1^{st}$ recording layer is recorded in '03h', a disc information type means a CAV mode, a write strategy (WS) type means $2^{nd}$ WS WS-2, and a write strategy (WS) interworks with them so that a CAV WS-2 is selected to be recorded.

Figure 10:
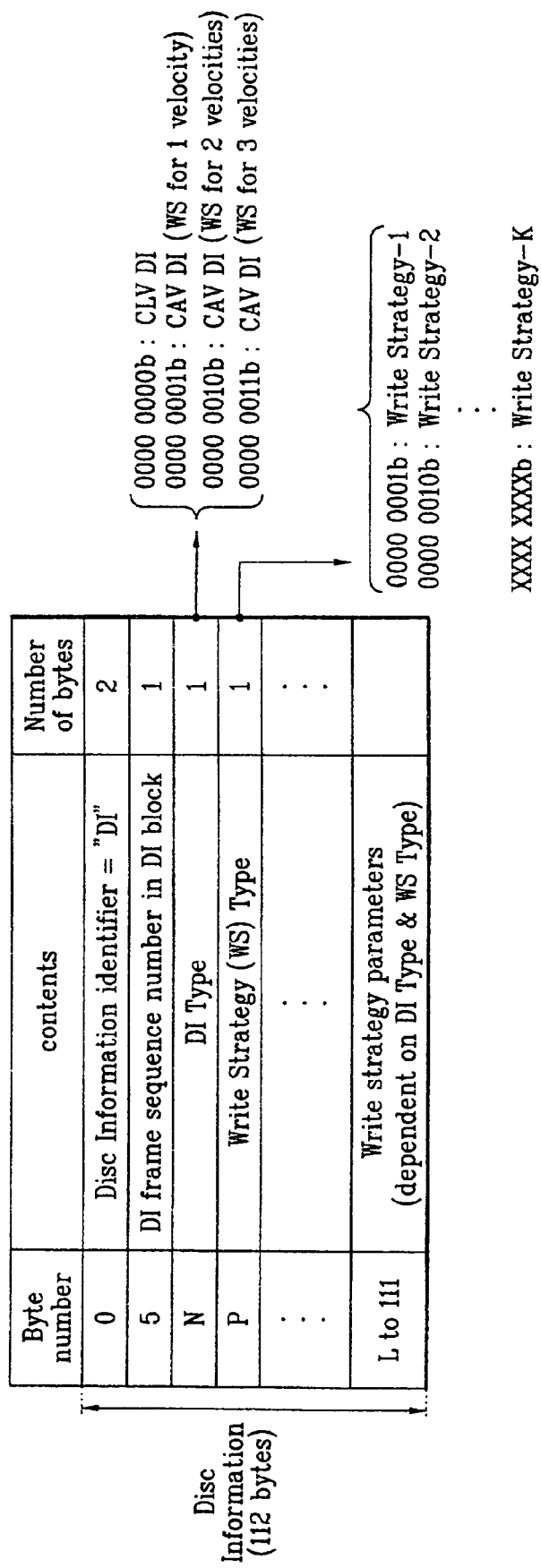
FIG. 10 is a diagram of control information recorded according to another further embodiment of the present invention.

FIG. 10 is a diagram of recording control information according to another further embodiment of the present invention, in which specific identification for CAV mode is subdivided to be applied to 'DI Type' field written in $N^{th}$ byte within disc information and in which information designating a write strategy (WS) type is recorded as well.

Referring to FIG. 10, in case that corresponding disc information means CAV mode, this is subdivided to identify how many velocities are provided by a write strategy (WS). Hence, 'DI Type' field can be defined as follows. If 'DI Type' field recorded in $N^{th}$ byte is '0000 0001b', it means CAV mode and a write strategy (WS) recorded in $L^{th}$~$111^{th}$ bytes is recorded to correspond to one kind of velocity only. If 'DI Type' field recorded in $N^{th}$ byte is '0000 0010b', it means CAV mode and a write strategy (WS) recorded in $L^{th}$~$111^{th}$ bytes is recorded to correspond to two kinds of velocities. If 'DI Type' field recorded in $N^{th}$ byte is '0000 0011b', it means CAV mode and a write strategy (WS) recorded in $L^{th}$~$111^{th}$ bytes is recorded to correspond to three kinds of velocities.

Moreover, 'Write Strategy (WS) Type' field is added to $P^{th}$ byte within disc information so that $L^{th}$~$111^{th}$ write strategy (WS) is recorded by interworking with a disc information type in $N^{th}$ byte and a write strategy (WS) type in $P^{th}$ byte. Namely, it can be defined as follows. If '0000 0000b' is written in $P^{th}$ byte, it means $1^{st}$ WS WS-1. If '0000 0010b' is written in $P^{th}$ byte, it means $2^{nd}$ WS WS-2. And, if 'XXXX XXXXb' is written in $P^{th}$ byte, it means $K^{th}$ WS WS-K.

FIG. 11 is a diagram of recording a write strategy within control information according to another further embodiment of the present invention in FIG. 10.

Referring to FIG. 11, '0000 0000b' is written in 'DI Type' field of $N^{th}$ byte to mean CLV mode. '0000 0001b' is written in 'Write Strategy (WS) Type' field of $P^{th}$ byte to mean 1st WS WS-1. $5^{th}$ byte is '00h' to mean 1× speed disc information of $1^{st}$ recording layer. And, a specific write strategy (WS) interworking with the $N^{th}$ and $P^{th}$ bytes is written in $L^{th}$~$111^{th}$ bytes within a disc.

As it is a CLV mode, a write strategy (WS) for one kind of velocity is recorded. As it is $1^{st}$ WS WS-1, parameters by '(n-1) WS' type are defined for example. Accordingly, a disc manufacturer records an optimal value in a corresponding disc.

If 'DI Type' field ($N^{th}$ byte) is set to '0000 0001b' to mean a CAV mode, or if 'Write Strategy (WS) Type' field is set to '0000 0010b' to mean $2^{nd}$ WS WS-2, it is apparent that write strategy (WS) parameters written in $L^{th}$~$111^{th}$ bytes should be recorded as new contents different from the parameters specified in FIG. 11 or the values of the corresponding parameters.

Figure 12:
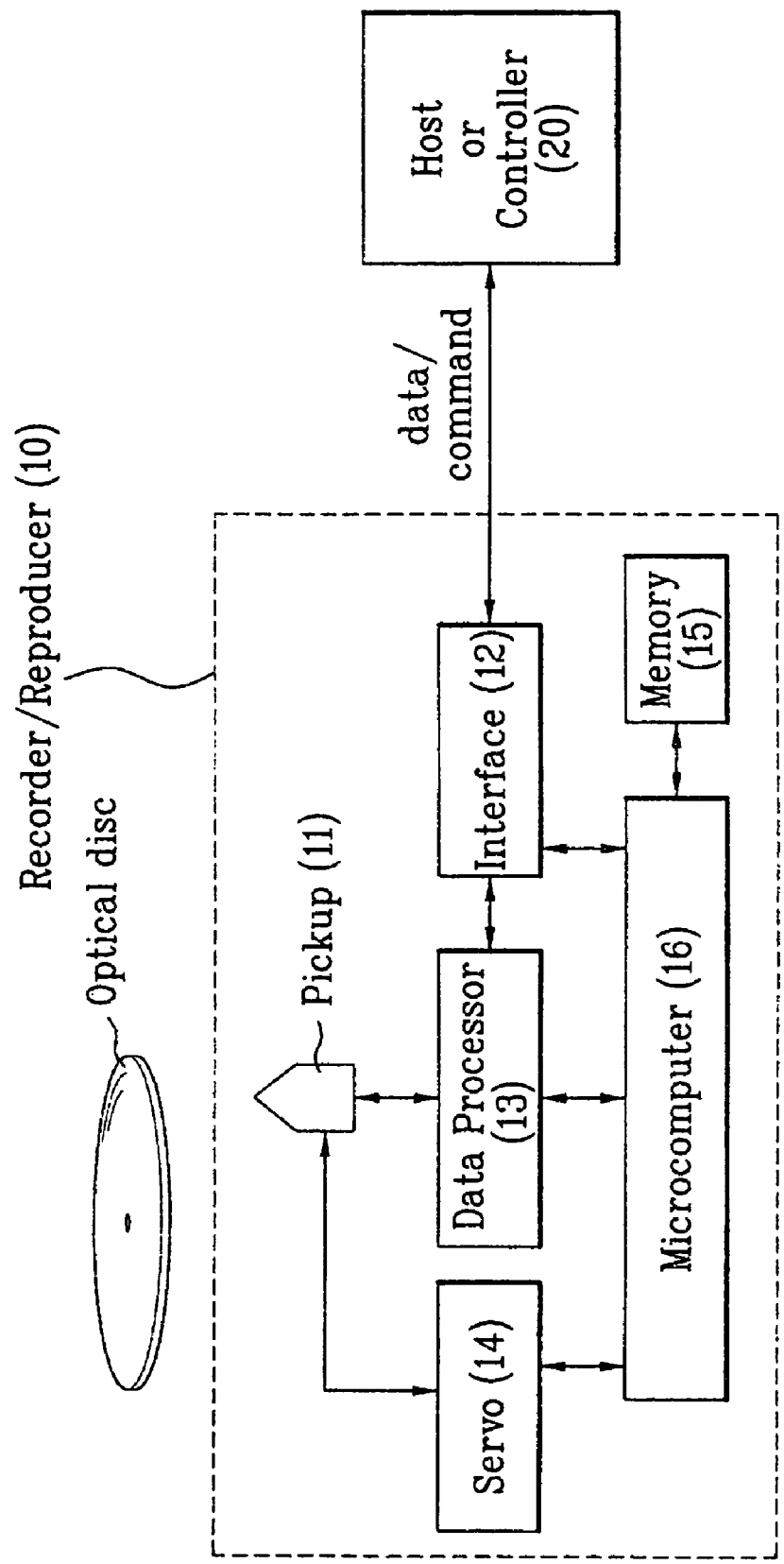
FIG. 12 is a block diagram of an optical disc recording/reproducing apparatus according to the present invention.

FIG. 12 is a block diagram of an optical disc recording/reproducing apparatus according to the present invention.

Referring to FIG. 12, a recording/reproducing apparatus according to the present invention includes a recorder/reproducer 10 carrying out recording/reproducing on an optical disc and a control unit 20 controlling the recorder/reproducer 10.

The control unit 20 gives a record or playback command for a specific area, and the recorder/reproducer 10 caries out the recording/reproducing on the specific area according to the command of the control unit 20. Specifically, the recorder/reproducer 10 includes an interface unit 12 performing communications with an external device, a pickup unit 11 directly recording data on the optical disc or reproducing the data, a data processor 13 receiving a playback signal from the pickup unit 11 to restore into a necessary signal value or modulating to deliver a signal to be recorded into a signal to be recorded on the optical disc, a servo unit 14 reading out a signal from the optical disc correctly or controlling the pickup unit 11 to record a signal on the optical disc correctly, a memory 15 temporarily storing management information including control information and data, and a microcomputer 16 responsible for controlling the above-described elements within the recorder/reproducer 10.

A disc information recording process of an optical disc according to the present invention is explained in detail as follows.

First of all, once an optical disc is loaded in the recording/reproducing apparatus, the entire disc management information within the disc is read out to be temporarily stored in the memory 15 of the recorder/reproducer 10. And, various kinds of the disc management information are utilized for the recording/reproducing of the optical disc. Specifically, the management information stored in the memory 15 includes disc information of the present invention. Hence, information for identifying a disc information type recorded within disc information, identification information for identifying a write strategy (WS), and write strategy parameter values interworking with them are read out to be temporarily stored in the memory 15.

If intending to perform a recording on a specific area within the optical disc, the control unit 20 renders such an intent into a writing command and then delivers it to the recorder/reproducer 10 together with data for writing location information to be recorded. After receiving the writing command, the microcomputer 16 decides the corresponding writing speed applied to an area within the optical disc from the management information (specifically via disc information) stored in the memory 15 and then performs the writing command by finding optimal write power by referring to a write strategy (WS) corresponding to the decided writing speed.

Accordingly, the present invention provides various methods of providing control information coping with higher writing speed in a high-density optical disc. Specifically, in recording a write strategy (WS) within disc information, CLV and CAV are separately recorded, whereby it is able to efficiently cope with the record/playback of the optical disc.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method of recording control information on a recording medium, comprising:
generating respective control information units associated with at least first and second recording layers, each control information unit for a specific recording layer, a specific recording velocity and a specific write strategy usable at the specific recording velocity, the respective control information units including type information identifying a type of the corresponding control information unit and a write strategy information dependent on the type of the corresponding control information unit, wherein the type information indicates whether the corresponding control information unit is usable for CLV (constant linear velocity) mode or CAV (constant angular velocity) mode, the write strategy information including write strategy parameters associated with CLV mode or CAV mode, wherein when the type information indicates the corresponding control information unit is usable for CAV mode, the corresponding control information unit includes information of at least three linear recording velocities and the write strategy information associated with the at least three linear recording velocities to be usable for performing the recording of data based on the CAV mode; and
recording the respective control information units on a specific area of the at least one of first and second recording layers.

2. The method of claim 1, wherein the write strategy parameters including first write pulse duration and first write pulse start time.

3. The method of claim 2, wherein the write strategy parameters further include erase pulse duration and first erase pulse start time.

4. The method of claim 2, wherein the generating step generates the respective control information units further including information for identifying velocities associated with the write strategy parameters if the type information indicates the corresponding control information unit for CAV (constant angular velocity) mode.

5. The method of claim 4, wherein the respective write strategy parameters associated with the respective velocities are included in the corresponding control information unit.

6. The method of claim 2, wherein the respective control information units include the write strategy parameters associated with one recording velocity if the type information indicates the corresponding control information unit for CLV (constant linear velocity) mode.

7. The method of claim 1, wherein the write strategy parameters are associated with write strategy type corresponding to the recording velocity.

8. The method of claim 7, wherein the write strategy type is one of at least two write strategy types corresponding to the recording velocity.

9. The method of claim 7, wherein the write strategy parameters associated with the type of corresponding control information unit and the write strategy type are included in the control corresponding information unit.

10. A method of recording control information on a recording medium, comprising: generating respective control information units associated with at least first and second recording layers, each control information units for a specific recording layer, a specific recording velocity and a specific write strategy usable at the specific recording velocity, the respective control information units including type information indicating whether parameters defined in the corresponding control information unit are usable for CLV (constant linear velocity) mode or CAV (constant angular velocity) mode and a write strategy information dependent on the corresponding recording layer and recording velocity, the write strategy information including write strategy parameters associated with CLV mode or CAV mode, wherein when the type information indicates the parameters defined in the corresponding control information unit is usable for CAV mode, the corresponding control information unit includes information of at least three linear recording velocities and the write strategy information associated with the at least three linear recording velocities to be usable for performing the recording of data based on the CAV mode; and
recording the respective control information unit on a specific area of at least one of first and second recording layers.

11. A recording medium, comprising:
at least two recording layers including first and second recording layers provided with a recordable area and a pre-recorded area, respectively, wherein a medium control information unit is provided respectively for each recording layer at the recordable area or the pre-recorded area of at least one of first and second recording layers, each medium control information units for a specific recording layer, a specific recording velocity and a specific write strategy usable at the specific recording velocity, and wherein the respective medium control information units include type information identifying a type of the corresponding medium control information unit and a write strategy information dependent on the type of the medium corresponding control information unit, wherein the type information indicates whether the corresponding medium control information unit is usable for CLV (constant linear velocity) mode or CAV (constant angular velocity) mode, the write strategy information including write strategy parameters associated with CLV mode or CAV mode, wherein when the type information indicates the corresponding medium control information unit is usable for CAV mode, the corresponding medium control information unit includes information of at least three linear recording velocities and the write strategy information associated with the at least three linear recording velocities to be usable for performing the recording of data based on the CAV mode.

12. The recording medium of claim 11, wherein the write strategy parameters includes first write pulse duration and first write pulse start time.

13. The recording medium of claim 12, wherein the write strategy parameters further include erase pulse duration and first erase pulse start time.

14. The recording medium of claim 12, wherein the respective medium control information unit further includes information for identifying velocities associated with the write strategy parameters.

15. The recording medium of claim 14, wherein the respective write strategy parameters associated with the respective velocities are included in the corresponding control information unit.

16. The recording medium of claim 11, wherein the write strategy parameters are associated with write strategy type corresponding to the recording velocity.

17. The recording medium of claim 16, wherein the write strategy type is one of at least two write strategy types corresponding to the recording velocity.

18. The recording medium of claim 16, wherein the write strategy parameters associated with the type of corresponding medium control information unit and the write strategy type are included in the corresponding medium control information unit.

19. An apparatus for recording control information on a recording medium, comprising:
a pickup configured to record data on the recording medium; and
a controller, operatively coupled to the pickup, configured to generate respective control information unit associated with at least two recording layers including first and second recording layers, each control information units for a specific recording layer, a specific recording velocity and a specific write strategy usable at the specific recording velocity, the respective control information unit including type information identifying a type of the corresponding control information unit and a write strategy information dependent on the type of the corresponding control information unit, wherein the type information indicates whether the corresponding control information unit is usable for CLV (constant linear velocity) mode or CAV (constant angular velocity) mode, the write strategy information including write strategy parameters associated with CLV mode or CAV mode, wherein when the type information indicates the corresponding control information unit is usable for CAV mode, the corresponding control information unit includes information of at least three linear recording velocities and the write strategy information associated with the at least three linear recording velocities to be usable for performing the recording of data based on the CAV mode, and the controller configured further to control the pickup to record the control information unit on a specific area of at least one of first and second recording layers.

20. The apparatus of claim 19, wherein the controller is configured to control the pickup to record the respective control information units in a writable area of the specific area.

21. The apparatus of claim 19, further comprising:
a memory, operatively coupled to the controller, configured to temporarily store the respective control information units.

22. The apparatus of claim 19, wherein the write strategy parameters including first write pulse duration and first write pulse start time.

23. An apparatus for recording data on a recording medium, comprising:
a pickup configured to read respective control information units associated with at least two recording layers including first and second recording layers from a management area of the recording medium, each control information units for a specific recording layer, a specific recording velocity and a specific write strategy usable at the specific recording velocity; and
a controller, operatively coupled to the pickup, configured to check a control information type based on type information to identify whether the corresponding respective control information units are usable for CLV (constant linear velocity) mode or CAV (constant angular velocity) mode, the write strategy information including write strategy parameters associated with CLV mode or CAV mode, wherein when the type information identifies the corresponding control information unit is usable for CAV mode, the corresponding control information unit includes information of at least three linear recording velocities and the write strategy information associated with the at least three linear recording velocities to be usable for performing the recording of data based on the CAV mode, and the controller configured further to control the pickup to record data by using a write strategy information included in the corresponding respective control information units as a result of the checking.

24. The apparatus of claim 23, wherein the controller is configured to control the pickup to record data at a corresponding recording velocity.

25. The apparatus of claim 23, wherein the controller is configured further to check a control information type based on a write strategy type identified by a write strategy type information, read a the write strategy parameters associated with the write strategy type from the corresponding respective control information units, and control the recording of data by using the write strategy parameters.

26. The apparatus of claim 23, wherein the controller is configured further to control a servo operation based on the control information for CLV (constant linear velocity) mode or CAV (constant angular velocity) mode.

27. The apparatus of claim 23, wherein the write strategy information further includes parameters associated with an erase multi-pulse duration and a first erase pulse start time, wherein the controller is configured to control the recording of data by using the parameters additionally.

28. The apparatus of claim 23, further comprising:
a memory, operatively coupled to the controller, configured to temporarily store the respective control information units associated with at least two recording layers including first and second recording layers to be used at recording of data.

29. A method of recording data on a recording medium, comprising:

reading respective control information units associated with at least first and second recording layers and recording velocity from a management area of the recording medium, each control information units for a specific recording layer, a specific recording velocity and a specific write strategy usable at the specific recording velocity;

checking type information recorded within the respective control information units, wherein the type information indicates whether the corresponding respective control information units are usable for CLV (constant linear velocity) mode or CAV (constant angular velocity) mode, the write strategy information including write strategy parameters associated with CLV mode or CAV mode, wherein when the type information indicates the corresponding control information unit is usable for CAV mode, the corresponding control information unit includes information of at least three linear recording velocities and the write strategy information associated with the at least three linear recording velocities to be usable for performing the recording of data based on the CAV mode; and performing a recording of data based on write strategy parameters included in the respective control information units.

30. The method of claim 29, wherein the write strategy parameters includes first write pulse duration, first write pulse start time, erase pulse duration and first erase pulse start time.

31. The method of claim 30, wherein the respective control information units further including information for identifying velocities associated with the write strategy parameters if the type information indicates the corresponding control information unit for CAV (constant angular velocity) mode.

* * * * *